Patented Oct. 9, 1945

2,386,685

UNITED STATES PATENT OFFICE 2,386,685

METHOD OF MAKING GLASS

Harrison P. Hood, Corning, N. Y., assignor to Corning Glass Works, Corning, N. Y., a corporation of New York No Drawing. Application February 14, 1944, Serial No. 522,372

1 Claim. (Cl. 49—77)

The melting or preparation of glass from a batch, to which this invention relates, broadly comprises two steps, the elevation of the batch to the melting temperature and the elimination of the gaseous products resulting from the reactions between the batch materials. The latter step hitherto has proved the more troublesome and, for eliminating the last visible traces of such reaction products, it is customary to employ fining agents in the batch which are usually materials, such as arsenic, which vaporize or yield gases in the later stages of melting and thus exert a sweeping or enlarging action upon the more persistent seeds.

The use of fining agents does not eliminate gases which are dissolved in the glass and hence are invisible. Dissolved gases have been found by analysis to amount ordinarily to upwards of 25 cc. to 50 cc. (standard temperature and pressure) per 100 grams of glass and are usually largely composed of carbon dioxide and water vapor. For some purposes, such dissolved gases are objectionable. For example, dissolved water in glass has a substantial influence upon the spectral characteristics of the glass and the amount of dissolved water contained in glass produced in the ordinary manner will cause substantially complete absorption of infra-red wave lengths in the neighborhood of $2.8\mu$. Conversely, glass which is substantially free from dissolved water and other infra-red absorbents has a high transmission for this wave length.

For various reasons it is desirable to completely eliminate all gases from the glass and also to avoid the use of fining agents, particularly arsenic which is poisonous. Various expedients have been proposed with this in view, such as the avoidance of batch materials which contain free or combined water or other gases. In the Patent 2,038,627 issued April 28, 1936, to A. E. Badger, there is shown a method for the elimination of seeds and bubbles entrapped during melting. The method comprises displacing interstitial air in the batch with helium so that all bubbles in the molten glass will consist of helium, and then permitting the helium to diffuse out of the molten glass.

None of these methods succeeds in entirely eliminating the dissolved gases and, although their solubility is relatively slight, small amounts of gases and particularly water vapor have great persistency, even at the highest temperatures.

The dissolved gases, as well as bubbles and seeds, have been completely eliminated by vacuum melting, but that method has been practiced only on a very small scale and requires elaborate and expensive apparatus. The difficulty of maintaining a proper vacuum increases so disproportionately to the size of the apparatus as to virtually prohibit the use of vacuum melting on a large scale.

An object of this invention is to produce glass which is free from dissolved water vapor and other gases.

Another object is to produce glass which contains no dissolved gases and which is also free from bubbles and seeds.

Another object is to produce a glass having a high infra-red transmission.

Another object is to provide a cheap and easy method for eliminating the gaseous reaction products of the glass batch from the final glass.

Another object is to provide a method for melting and fining glass without the use or fining agents.

To those and other ends the invention comprises heating a glass batch slowly to an elevated temperature but not above about 800° C., contacting the heated batch with a current of dry air which is free from carbon dioxide until the gaseous by-products of the reacting batch materials have been eliminated and thereafter melting the batch.

I have found that when a glass batch is heated slowly to about 600° C. to 800° C., or somewhat below the softening temperature of the corresponding finished glass, and the partial pressure of water vapor and carbon dioxide in contact with the batch is maintained as near zero as possible until gaseous by-products of the reacting batch materials are no longer evolved, the batch, when subsequently melted, will produce a glass which is nearly as free from water vapor and carbon dioxide as if it had been melted in a vacuum.

In practicing the invention, air is freed from carbon dioxide and moisture in known manner by being passed first through a scrubbing tower containing soda lime or a solution of caustic soda and thereafter through a tower or other suitable apparatus containing drying agents, such as silica gel or through a refrigerating unit. The glass batch to be treated is then heated slowly to about 600° C. to 800° C. and the dried air is passed through and over it in such a manner as to bring the heated grains in contact therewith and fill all the interstices between them.

If desired, the batch can be preheated and treated in the same container in which it is to be melted and the dry air may be introduced through a silica tube inserted into the batch in the manner shown in the above mentioned Badger patent.

Alternatively, the batch may be disposed in shallow pans and heated by radiation from above. During heating, the batch is periodically turned over by stirring or raking while the dried air is continuously passed over it. After treatment the batch is transferred to the melting container and melted in the usual manner.

The time of treatment which is necessary for best results will obviously vary with different batches, depending upon the materials used and their contents of combined water and other gases. In general, with ordinary lime glass composed of sand, sodium carbonate and hydrated lime, from one to two hours heating at about 700° C. in contact with dried $CO_2$-free air followed by melting in the usual manner suffices to produce a glass which is nearly as free from dissolved gases as though it had been melted in a vacuum.

Glasses which have been made by my new process, although free from dissolved gases, sometimes contain bubbles of entrapped air, especially when the conventional fining agents are omitted. In order to produce glasses under such circumstances which are not only free from dissolved gases but are also free from bubbles and seeds, I have found it advantageous, after the gaseous reaction products have been eliminated to displace the interstitial air with helium in the manner shown and described in the aforementioned Badger patent and after the batch has been melted to maintain the glass in a molten condition until any bubbles of helium entrapped during melting have diffused out of the glass.

I claim:

The method of making glass, which comprises slowly heating a glass batch to an elevated temperature between about 600° C. and 800° C., maintaining the heated batch under atmospheric pressure, passing through and over the batch a current of air which is substantially free from carbon dioxide and water vapor until the gaseous by-products of the reacting batch materials have been eliminated, and thereafter melting the batch.

HARRISON P. HOOD.